United States Patent [19]

Schmidt et al.

[11] 4,166,193

[45] Aug. 28, 1979

[54] INSULATORS WITH INCREASED SURFACE CONDUCTIVITY AND METHOD FOR INCREASING THE CONDUCTIVITY ON SURFACES OF INSULATORS HAVING HIGH ELECTRICAL RESISTANCE MADE OF INORGANIC AND ORGANIC MATERIALS SUCH AS CERAMIC, GLASS, PLASTIC AND RESIN

[75] Inventors: Conrad Schmidt, Meckesheim; Gustav Bünger, Mannheim; Paul Weiss, Oftersheim, all of Fed. Rep. of Germany

[73] Assignee: Brown Boveri & Cie Aktiengesellschaft, Mannheim, Fed. Rep. of Germany

[21] Appl. No.: 855,287

[22] Filed: Nov. 28, 1977

[51] Int. Cl.$^2$ .................. H01B 9/04; H01B 17/58
[52] U.S. Cl. .................. 174/28; 174/16 B; 174/137 R
[58] Field of Search .......... 174/28, 29, 16 B, 12, 174/111, 99 B, 137 R, 138 R

[56] References Cited

U.S. PATENT DOCUMENTS

| | | | |
|---|---|---|---|
| 3,137,633 | 6/1964 | Kline | 174/137 X |
| 3,356,785 | 12/1967 | Yoshida et al. | 174/28 |
| 3,361,866 | 1/1968 | Babigan | 174/28 |
| 3,801,725 | 4/1974 | Farish | 174/28 |
| 3,962,609 | 6/1976 | Chaudhuri | 174/28 X |

*Primary Examiner*—Arthur T. Grimley
*Attorney, Agent, or Firm*—Herbert L. Lerner

[57] ABSTRACT

A solid insulator having high electrical resistance of inorganic and organic materials such as ceramic, glass, plastics, resins which is treated by application of an ion beam to the insulator surface to effect incorporation by controlled implantation of ions in the insulator adjacent its surface to produce an insulator surface of desired conductivity. This overcomes the difficulties due to uneven voltage distributions on the insulator surface which can cause discharges and even the destruction of the insulator.

15 Claims, 4 Drawing Figures

INSULATORS WITH INCREASED SURFACE CONDUCTIVITY AND METHOD FOR INCREASING THE CONDUCTIVITY ON SURFACES OF INSULATORS HAVING HIGH ELECTRICAL RESISTANCE MADE OF INORGANIC AND ORGANIC MATERIALS SUCH AS CERAMIC, GLASS, PLASTIC AND RESIN

BACKGROUND OF THE INVENTION

1. Field of the Invention

This invention relates to insulators having high electrical resistance and to a method for increasing the conductivity on surfaces of insulators of organic material such as ceramic, glass, etc., or of inorganic materials such as plastic, epoxy resin, other casting resins, etc., or of mixtures of both materials.

2. Description of the Prior Art

Insulators of organic or inorganic materials such as ceramic, glass, plastic and resin are used for separating conductors so as to prevent undesired flow of current from the conductors to other objects. These insulators have high electrical resistance, usually above 12 ohm cm and normally exhibit a specific bulk resistance of about $10^{14}$ ohm cm. As a result leakage currents come about which, while negligible in normal cases, lead to surface charges, as for instance, by the presence of irregularities on the surface of the insulator. The leakage currents are in the nanoampere range, for a resistivity of about $10^{14}$ ohm cm and 300 kV. Such irregularities may be due to the material; they can also be due to cleaning agent residues which remained on the surface of the insulator from cleaning.

These uneven voltage distributions on the surface of the insulator can later cause discharges, which under some circumstances can bring about the destruction of the insulator. One strives here either to avoid the generation of local charges altogether or to make provision that the charges can flow off.

In outdoor support insulators, the outside surface of the insulator had been coated with a semiconducting layer in order to conduct off charges which, due to soiling of the surface, have settled on the outside surface of the insulator. Such semiconducting layers are, for example, graphite or the like. With the presently known methods of application, the resistance of such semiconducting layers is too low; it is in the range of about $10^4$ to $10^5$ ohm. In applications of high-voltage d-c transmission (EHV), with the voltage differences present between the inner and outer conductor, this leads to currents which excessively heat-up the insulator, making the latter no longer usable.

Other materials, such as metals which are applied by known methods, e.g., plasma spraying, physical or chemical vapor deposition sputtering, electrolysis, electrophoresis, reactive vapor deposition or ion plating as well as carbonizing or irradiation with alpha-, beta- or gamma rays etc., are disadvantageous even if they are applied to the insulator in only atomic thicknesses, as too large a current flows. In addition, the quality of the layer deposited on the insulator is not sufficiently high, in part because it is difficult and possible only at great cost to fix the layer thickness accurately, and partly because the adhesion of the layer to the insulator is poor. Further, there is danger of radiation damage and, in the case of the use of organic materials, of carbon formation.

SUMMARY OF THE INVENTION

It is an object of the invention to provide an insulator having high electrical resistance with an insulator surface of desired conductivity and a method for adjusting the surface conductivity or the surface resistance of the insulator to the desired values.

With the foregoing and other objects in view, there is provided in accordance with the invention a solid insulator for separating conductors so as to prevent undesired flow of current from the conductors to other objects, the insulator having high electrical resistance of above about 12 ohm cm, and a band gap between the conduction band and the valence band of above about 5 eV, and an insulator surface of desired conductivity obtained by incorporation by controlled implantation of ions in the insulator adjacent its surface.

In accordance with the invention, there is provided a method of increasing the electrical conductivity at the surfaces of solid insulators for separating conductors so as to prevent undesired flow of current from the conductors to other objects, the insulator having high electrical resistance of above about 12 ohm cm, and a band gap between the conduction band and the valence band of above about 5 eV, which includes incorporating ions by controlled implantation in the insulator adjacent its surface to obtain a desired conductivity at the surface of the insulator.

Other features which are considered as characteristic for the invention are set forth in the appended claims.

Although the invention is illustrated and described herein as embodied in insulators with increased surface conductivity and method for increasing the conductivity on surfaces of insulators having high electrical resistance made of inorganic and organic materials such as ceramic, glass, plastic and resin, it is nevertheless not intended to be limited to the details shown, since various modifications may be made therein without departing from the spirit of the invention and within the scope and range of equivalents of the claims.

BRIEF DESCRIPTION OF THE DRAWINGS

The invention, however, together with additional objects and advantages thereof will be best understood from the following description when read in connection with the accompanying drawings, in which.

DETAILED DESCRIPTION OF THE INVENTION

Figure 1:
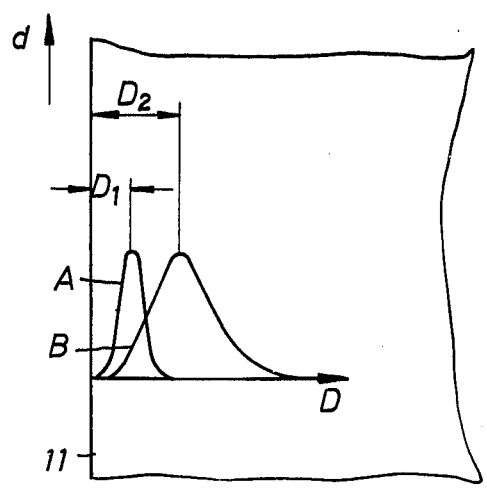
FIG. 1 diagrammatically shows an insulator which was bombarded with ions and ion concentration distribution curves.

The surface resistance of the insulator is changed by incorporating ions or atoms by means of controlled ion implantation to obtain a desired conductivity at the surface or in the bulk near the surface.

Implantation equipment for carrying out the method according to the invention, i.e., for the implantation of ions or atoms, is known. Such equipment can be procured from a firm High-Voltage/DANSK-Fysik, Germany. We have made tests with a 350-KV implantation equipment of this firm. The "Institute for Applied Solid-State Physics in Freiburg i. Breisgau, West Germany" is the installation site of such a machine.

By means of the above-mentioned equipment or similar equipment, an ion beam of about 2 to 3 mm diameter is directed toward the material to be treated for implementation. This beam can be "fanned out" by electric and/or magnetic fields to a beam cross section of 75 mm diameter max.

The current to be set here depends on the implanted substances (e.g., $Ag^+$, $Mg^+$, $Cd^+$, $In^+$, $Sn^+$, $C^+$, $Kr^+$, but also others), and moves in the range of about 1 $\mu A$ to 100 $\mu A$. Currents of 20 to 30 $\mu A$ are typical for most implanted substances.

The voltage values to be set for this process are preferably in the range from about 5 kV to 300 kV; in special cases, however, values up to about 500 kV may be advantageous.

The radiation dose can be controlled, particularly by means of the exposure time. The irradiation time can stretch from one or a few minutes to several hours, depending on the implanted material and the required conductivities.

Although implantation was used for doping semiconductor elements, the materials and products are quite different from the insulators of the present invention. The insulators have high electrical bulk resistance above about 12 ohm cm and a band gap between the conduction band the valence band above about 5 eV. Semiconductors have relatively low bulk electrical resistance, generally below about 5 ohm cm and are characterized by the band gap between the conduction band and the valence band of about 2 eV. The insulators and the semiconductors are so physically different, that the semiconductors would not serve as insulators of high electrical resistance and conversely the insulators would not serve the purpose of semiconductors.

By treatment of the surface by means of ion implantation in accordance with the invention there is obtained accurately and exactly targeted resistivity or conductivity values near the surface of the conductor. A preferred surface resistance value is about $10^6$ ohm to more advantageously a value of $10^9$ ohm. The upper limit for the surface resistance adjusted by irradiation is below but within the range of the natural resistance of the insulator. Of course, the resistance can be adjusted to values of $10^{10}$ or $10^{12}$ ohm, but this is ordinarily not done as a value of $10^9$ ohm or somewhat lower is preferred. Insulators with a plastic base or also with an inorganic base ($Al_2O_3$, ceramics, glass, $SiO_2$) can be treated by means of this ion beam.

The surface conductivity generated by implantation depends relatively little on the kind of ion, i.e., whether sodium, potassium or cesium ions or atoms are implanted, and to a greater extent on the energy; but depends substantially on the intensity of the radiation (number of particles per unit area) and on the duration of the exposure. In ion implantation, an ion concentration is formed just below the surface, which follows approximately a Gaussian distribution curve. This means that there is a concentration maximum at a definite distance below the surface. The height of this maximum ion concentration can be varied with the duration of the exposure, and the depth by the energy of the ions, and by the type of the ions. If the ion energy is relatively small, the maximum ion concentration is closely below the surface, while with higher energy the maximum is located deeper in the volume. For this reason, there is obtained a definite and determinable ion concentration distribution, starting from the surface inward, by varying essentially the intensity and the energy and, lastly, also by changing the type of ions. If the energy is at first low, the maximum ion concentration is located closely below the surface, as mentioned above. By increasing the energy, the maximum ion concentration can be shifted deeper into the insulator, so that a kind of summing curve is generated, which can be shaped as a parabola, hyperbola, etc. It is desirable to shape the summing curve so that it meets the surface approximately perpendicularly and corresponds in rough approximation to one-half of a Gaussian distribution curve or one-half of a sine curve.

The field of application of ion implantation for incorporating ions into the surfaces of insulators is large. In the drawings, an insulator is shown in general form as well as a disk-type insulator for an $SF_6$-encapsulated high-voltage d-c transmission line.

Referring to FIG. 1, an insulator 11 consisting of ceramic is shown in section to illustrate the surface of the insulator subjected to the ion beam. Of course, the insulator may be made of cast resin or glass. The insulator 11 has been irradiated by means of an ion implantation equipment distributing the ions as shown by ion concentration distribution curve A. It can be seen that the curve follows approximately a Gaussian distribution law, so that a maximum of the ion concentration d is located at a certain distance below the surface, the distance being D1. The ion concentration is shown as increasing vertically upward as shown by the letter d next to the vertical arrow (ordinate). The depth measured from the surface of the insulator is shown by the letter D next to the horizontal arrow (abscissa). While the height of the maximum ion concentration depends on the duration, i.e., the intensity of the ion radiation, and little on the energy, the depth D1 depends only on the energy which the ions possess when hitting the surface of the insulator 1.

In curve A, this energy is relatively small. In curve B, this energy is considerably larger. Here, while the maximum has the same height, it is at a distance D2 below the surface. In order to bring the maximum to about the same height, the energy as well as the intensity must be increased. The maximum ion concentration as well as the distance from the surface can be adjusted to the desired value by varying the intensity of the ion radiation and the energy of the ions. Ion implantation occurs at as well as below the surface of the insulator but the depth of penetration of the maximum ion concentration is very small, generally a fraction of a millimeter. The term "adjacent" with respect to ion implantation includes at and below the surface. The fact that the maximum is located below the surface has an advantage under some circumstances in that the surface is not occupied by the ions, so that there is no direct danger of damage to the electrically conductive or electrically conducting layer.

Figure 2:
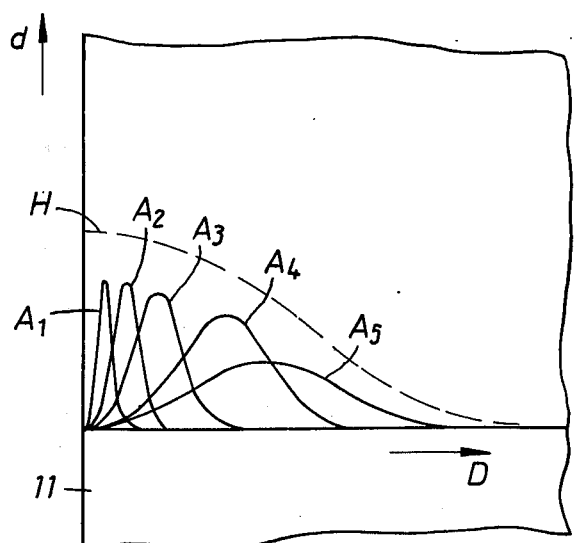
FIG. 2 diagrammatically shows another insulator with a plurality of curves to a desired ion concentration distribution curve.

FIG. 2 illustrates the insulator with a conductive surface layer in a defined manner. Several curves, depending on the intensity, and the energy, are plotted here, i.e., curves A1, A2, A3, A4 and A5. While curve A1 represents a concentration, for which a relatively low ion energy was used, the curves A2, A3, A4 and A5 were obtained with respectively increasing energy and increasing intensity.

The integrated areas below the curves produce a curve H which represents an optimum value for increasing the conductivity for the purpose of conducting off charge carriers or charges on the surface of the insulator. It is not essential that curve H be obtained, curve A or curve B according to FIG. 1 may be used. If the area below curve A is equal to the area below curve B, then no substantial difference in the conductivity is obtained, as tests have shown.

The application of ion implantation to insulators in high-voltage d-c transmission systems gives favorable results. However, in metal-encapsulated, $SF_6$-insulated switching installations which transmit essentially a-c, ion implantation for increasing the conductivity at the surface is not absolutely necessary. Only if one assumes that the section of the switching installation between the last disconnect section on the cable side and the cable is subjected to a d-c cable test, would it make sense to increase the surface conductivity of the compartmentalizing and support insulators. In the case of a-c voltage, one deals substantially with so-called capacitive control, i.e., the material and the design of the insulator as well as electrodes near the insulator determine the field distribution in the insulator. For these systems, there is thus less of a need to adjust targeted surface conductivities, as distortions due to foreign-matter layers seldom occur in encapsulated systems.

Influencing the field distribution by means of ohmic control is possible but can be accompanied under some circumstances by power losses, so that attention would have to be paid to the heat removal. For this reason the number of applications of the method according to the invention is relatively small in a-c transmission switching system, while the main application is seen in EHV systems.

Figure 3:
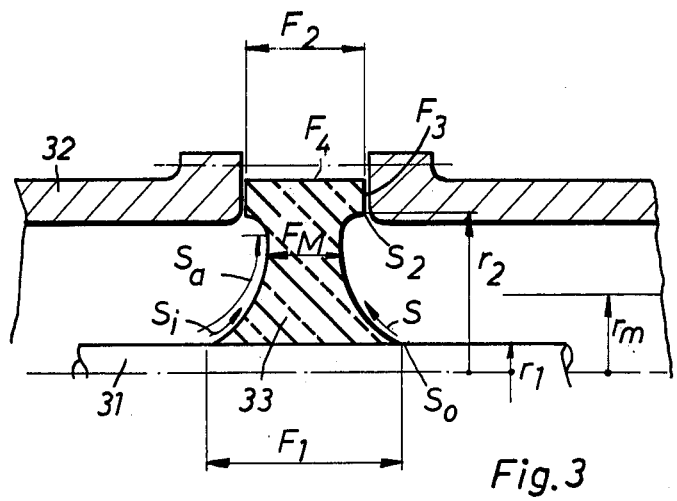
FIG. 3 is a section of a disk-type insulator for a high-voltage d-c transmission switching installation.
Figure 4:
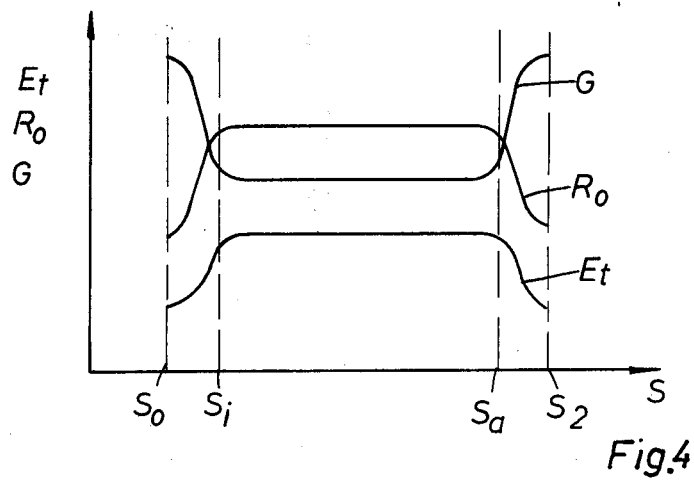
FIG. 4 is a graphic presentation of the tangential field strength over the surface of the insulator radially outward as well as the distribution of the surface resistance and the distribution of the surface conductivity.

In the switching installations, in which cast resin is advantageously used for the suppport and compartmentalizing insulators, the dielectric strength of these insulators is determined by the potential and field distribution. The latter results from the ohmic and capacitive properties of the insulators. The capacitive distribution is largely determined by the geometry of the insulator and is accordingly optimized with respect to the dielectric strength. By means of ion implantation, the ohmic properties can be adjusted so that an optimum potential and field distribution is obtained. In FIG. 3, an insulator 33 separates and insulates an inner conductor 31 from an encapsulation or outer conductor 32. The thickness of the insulator 33 in the axial direction F1 at the inside radius r1 is approximately as large as the thickness of the insulator 33 at its radius r2. The thickness of the insulator 33 at its outer radius r2 is designated as F2. The thickness of the insulator 33 at about the mean radius rm is designated Fm. This thickness is smaller than the values F1 and F2. As has been found by calculation, the shape of the tangential field intensity $E_t$ advancing from the point $S_0$ at the base of the insulator 33 in the direction S is as shown in FIG. 4. The tangential field intensity $E_t$ is relatively small in the region $S_0$ and then rises quickly to a higher value Si and drops again in the vicinity of the point $S_2$, i.e., at the outer radius r2.

The ohmic control can be adapted to this capacitive control so that the shape of the ohmic control is approximately similar. This is shown in FIG. 4 by the curve $R_0$. Here, the ohmic surface resistance is plotted versus the distance S. It is seen that $R_0$ increases from a low value at the point $S_0$ and drops again to the approximately equal low value $S_2$. The surface conductivity G shows the reverse shape.

To obtain these curves, it is necessary to adjust the ion concentration so that the desired surface resistance curves or conductivity curves are obtained. This is accomplished by incorporating, for instance, silver, manganese, copper or indium ions in the region of the inner radius with relatively high energy and/or high intensity and decreasing the energy or intensity gradually up to the value at $S_i$, leaving it approximately constant and then increasing it again from the point $S_a$ on. This desired conductivity or field and potential control can be adjusted without difficulty by ion implantation. This has the advantage that the conductive layer is not directly located on the outer surface of the insulator so that it is not exposed directly to the ambient environment with the possibilities of contamination and the like.

As tests have shown, the resistance $R_0$ decreases with increasing ion concentration. Insulators of shapes other than an insulator shown in FIG. 3 may be implanted with ions. However, it must be noted that the ion concentration, as far as the maxima and minima are concerned should desirably approximately follow the inverse of the distribution of the tangential field intensity over the developed surface (radially outward). In a known cone insulator, the tangential field intensity is a maximum at certain transition points, the minima of the ion concentration, i.e., the maxima of the surface resistance patterns, should be located there.

The current density decreases as with a leakage current from the inside out. It is not necessary to provide the same ion concentration densities at all points which are located at the respective, approximately equal distance (the tangential field intensity distribution being approximately symmetrical) from the inside or outside radius. A higher density can be obtained at the inside radius and less density at the outside radius.

In the insulator design according to FIG. 3, ions may be implanted not only at the lateral surfaces but also at the surfaces which are in the vicinity of the outer encapsulation, i.e., at the surfaces F3 and F4. At the present time, however, it appears simpler for this type of insulator to apply at these points a coating of conducting varnish, e.g., silver varnish so as not to obtain corona or glow discharges at these points but to achieve a complete transfer of current between the outer encapsulation and the insulator.

Increase of the conductivity of the insulators can be accomplished in accordance with the invention and it is also possible to provide certain locations with increased conductivity, for example, in order to obtain certain defined current paths. The following example illustrates the present invention. Samples in form of a cube with a side length of 1 cm of organic material having a resistance of higher than $10^{12}$ ohm cm and a band gap above 5 eV were subjected to ion implantation with a 350 kV ion implantation equipment of High-Voltage DANSK-Fysik to implant metal ions as $Ag^+$, $Mg^+$, $In^+$, $Cd^+$, $C^+$ or $Kr^+$. Only four surfaces of the cube have been implanted. The remaining both sides were metalized for electric contact. The ion current used varied within 1 $\mu A$ to 100 $\mu A$ depending on the ionization probability of the particular ion and its parent gas. Implantations have been done with 30, 100 and 300 keV in order to change the depth profile of the implanted ions. The irradiation dose was changed in the range for instance from $10^{15}$ $Ag/cm^3$ to $10^{17}$ $Ag/cm^3$ with the result of changing the resistances of the samples from $10^{11}$ ohm through $10^5$ ohm.

There are claimed:

1. A solid insulator for separating conductors so as to prevent undesired flow of current from the conductors to other objects, said insulator having high electrical resistance of above about 12 ohm cm, and a band gap between the conduction band and the valence band of above about 5 eV, and an insulator surface of desired conductivity obtained by incorporation by controlled implantation of ions in the insulator adjacent its surface.

2. Insulator according to claim 1, wherein the insulator has a specific surface resistance resulting from incorporation of ions adjacent the surface of from about $10^5$ ohm to about $10^{11}$ ohm.

3. Insulator according to claim 1, wherein the ions are selected from the group consisting of ions of Ag, Mg, Cu and In.

4. Insulator according to claim 1, wherein the insulator separates an inner conductor and an outer conductor, and wherein the surface conductivity by incorporation of ions of the insulator separating the conductors is higher in the vicinity of the inner conductor and in the vicinity of the outer conductor than in the central region of the insulator between the inner and outer conductors.

5. A solid insulator for separating conductors so as to prevent undesired flow of current from the conductors to other objects, said insulator having high electrical resistance of above about 12 ohm cm, and a band gap between the conduction band and the valence band of above about 5 eV, and an insulator surface of desired conductivity obtained by incorporation by controlled implantation of ions in the insulator adjacent its surface, and wherein the insulator separates conductors in an encapsulated, gas-insulated high-voltage d-c transmission system, and wherein there is a tangential field intensity of non-uniform intensity along the surface of the insulator, and wherein the insulator has an ohmic surface resistance obtained by said incorporation of ions, proportional to the tangential field intensity along the surface of the insulator.

6. Insulator according to claim 1, wherein the insulator is disposed between conductor parts carrying high voltage and parts connected to the ground.

7. A method of increasing the electrical conductivity at the surfaces of solid insulators for separating conductors so as to prevent undesired flow of current from the conductors to other objects, said insulator having high electrical resistance of above about 12 ohm cm, and a band gap between the conduction band and the valence band of above about 5 eV, which comprises incorporating ions by controlled implantation in the insulator adjacent its surface to obtain a desired conductivity at the surface of the insulator.

8. Method according to claim 7, wherein implanting of ions is effected by an ion beam directed toward the insulator and the ion beam moved by an electric field to implant ions in a larger area of surface of the insulator.

9. Method according to claim 7, wherein implanting of ions is effected by an ion beam directed toward the insulator and the ion beam moved by a magnetic field to implant ions in a larger area of surface of the insulator.

10. Method according to claim 7, wherein controlled implantation of ions is effected by directing an ion beam toward the insulator and varying at least one of the factors consisting of intensity of the ion beam, energy of the ion beam, and irradiation time of the ion beam, to obtain desired conductivity at the surface of the insulator.

11. Method according to claim 7, wherein ions are implanted in the insulator adjacent its surface to obtain a specific conductivity at the surface of the insulator of from about $10^5$ ohm to about $10^{11}$ ohm.

12. Method according to claim 7, wherein the ions for implanting are selected from the group consisting of ions of Ag, Mg, Cu and In.

13. A method of increasing the electrical conductivity at the surfaces of solid insulators for separating conductors so as to prevent undesired flow of current from the conductors to other objects, said insulator having high electrical resistance of above about 12 ohm cm, and a band gap between the conduction band and the valence band of above about 5 eV, which comprises incorporating ions by controlled implantation in the insulator adjacent its surface to obtain a desired conductivity at the surface of the insulator, and wherein controlled implantation of ions is effected by directing an ion beam toward the insulator and varying at least one of the factors consisting of intensity of the ion beam, energy of the ion beam, and irradiation time of the ion beam, to obtain desired conductivity at the surface of the insulator, and wherein the insulator separates an inner conductor and an outer conductor, and wherein the ion beam is applied to the surface of the insulator to effect ion implantation density of the insulator higher in the vicinity of the inner conductor and in the vicinity of the outer conductor than in the central region of the insulator, the conductivity varying directly with the ion implantation density and the resistivity inversely proportional to the implantation density.

14. A method of increasing the electrical conductivity at the surfaces of solid insulators for separating conductors so as to prevent undesired flow of current from the conductors to other objects, said insulator having high electrical resistance of above about 12 ohm cm, and a band gap between the conduction band and the valence band of above about 5 eV, which comprises incorporating ions by controlled implantation in the insulator adjacent its surface to obtain a desired conductivity at the surface of the insulator, and wherein controlled implantation of ions is effected by directing an ion beam toward the insulator and varying at least one of the factors consisting of intensity of the ion beam, energy of the ion beam, and irradiation time of the ion beam, to obtain desired conductivity at the surface of the insulator, and wherein the insulator separates conductors in an encapsulated, gas-insulated high-voltage d-c transmission system, and wherein there is a tangential field intensity of non-uniform intensity along the surface of the insulator, and wherein the ion beam is applied to the surface of the insulator to effect an ohmic surface resistance proportional to the tangential field intensity along the surface of the insulator.

15. A method of increasing the electrical conductivity at the surfaces of solid insulators for separating conductors so as to prevent undesired flow of current from the conductors to other objects, said insulator having high electrical resistance of above about 12 ohm cm, and a band gap between the conduction band and the valence band of above about 5 eV, which comprises incorporating ions by controlled implantation in the insulator adjacent its surface to obtain a desired conductivity at the surface of the insulator, and wherein the insulator is disposed between conductor parts carrying high voltage and parts connected to the ground.

* * * * *